US012585791B2

(12) United States Patent
Guo

(10) Patent No.: US 12,585,791 B2
(45) Date of Patent: Mar. 24, 2026

(54) ENCRYPTED COMMUNICATION METHOD AND ELECTRONIC DEVICE

(71) Applicant: GUANGDONG OPPO MOBILE TELECOMMUNICATIONS CORP., LTD., Dongguan (CN)

(72) Inventor: Hua Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 755 days.

(21) Appl. No.: 17/886,246

(22) Filed: Aug. 11, 2022

(65) Prior Publication Data

US 2022/0382886 A1      Dec. 1, 2022

Related U.S. Application Data

(63) Continuation of application No. PCT/CN2021/073732, filed on Jan. 26, 2021.

(30) Foreign Application Priority Data

Mar. 9, 2020   (CN) ......................... 202010155715.X

(51) Int. Cl.
| | |
|---|---|
| *G06F 21/60* | (2013.01) |
| *G06F 21/43* | (2013.01) |
| G06F 21/10 | (2013.01) |

(52) U.S. Cl.
CPC ............ *G06F 21/602* (2013.01); *G06F 21/43* (2013.01); *G06F 21/107* (2023.08)

(58) Field of Classification Search
CPC ....... G06F 21/602; G06F 21/43; G06F 21/107
See application file for complete search history.

(56) References Cited

U.S. PATENT DOCUMENTS

| | | | |
|---|---|---|---|
| 6,708,272 B1 | 3/2004 | McCown et al. | |
| 8,719,573 B2 * | 5/2014 | Ran ...................... | H04L 9/0861 |
| | | | 713/170 |

(Continued)

FOREIGN PATENT DOCUMENTS

| | | |
|---|---|---|
| CN | 101261675 A | 9/2008 |
| CN | 103986503 A | 8/2014 |

(Continued)

OTHER PUBLICATIONS

First Examination Report (FER) dated Mar. 6, 2023 received in Indian Patent Application No. IN202227057078.

(Continued)

*Primary Examiner* — Kambiz Zand
*Assistant Examiner* — Afaq Ali
(74) *Attorney, Agent, or Firm* — Sheppard, Mullin, Richter & Hampton LLP

(57) ABSTRACT

An encrypted communication method is applied in a first electronic device, which includes a first processor communicating through encrypted channel of first Bluetooth, and a second processor communicating through unencrypted channel of second Bluetooth. The method includes: receiving, by the first processor, a key transmitted from a second electronic device, and transmitting the key to the second processor, the key being transmitted from the second electronic device to the first processor through the encrypted channel of the first Bluetooth; receiving, by the second processor in response to the first electronic device being switched to a system run by the second processor, a first ciphertext transmitted from the second electronic device, the first ciphertext being transmitted from the second electronic device to the second processor through the unencrypted channel of the second Bluetooth; and decrypting, by the (Continued)

second processor, the first ciphertext with the key to obtain the first plaintext.

17 Claims, 10 Drawing Sheets

(56) References Cited

U.S. PATENT DOCUMENTS

| | | | | |
|---|---|---|---|---|
| 11,140,160 | B2 * | 10/2021 | Liu | H04L 63/0876 |
| 2011/0317839 | A1 * | 12/2011 | Yoneda | H04W 12/03 |
| | | | | 380/270 |
| 2012/0300936 | A1 * | 11/2012 | Green | H04L 9/088 |
| | | | | 380/278 |
| 2013/0259230 | A1 | 10/2013 | Polo et al. | |
| 2014/0094198 | A1 * | 4/2014 | Heo | H04W 52/0274 |
| | | | | 455/456.4 |
| 2014/0359274 | A1 | 12/2014 | Kirkup et al. | |
| 2016/0063496 | A1 * | 3/2016 | Royyuru | G06Q 20/405 |
| | | | | 713/168 |
| 2016/0182223 | A1 * | 6/2016 | Kishinevsky | H04L 9/0631 |
| | | | | 380/28 |
| 2017/0250802 | A1 | 8/2017 | Shimizu et al. | |
| 2017/0289735 | A1 | 10/2017 | Rajapaksa et al. | |
| 2017/0346814 | A1 * | 11/2017 | Chen | H04L 9/0618 |
| 2018/0103499 | A1 * | 4/2018 | Lee | H04W 76/15 |
| 2018/0152837 | A1 | 5/2018 | Modzelewski et al. | |
| 2018/0337911 | A1 * | 11/2018 | Coggin | G06F 21/45 |
| 2019/0172285 | A1 | 6/2019 | Jin | |
| 2019/0188397 | A1 | 6/2019 | Benson et al. | |
| 2019/0215624 | A1 * | 7/2019 | Solum | H04R 25/505 |
| 2019/0223014 | A1 | 7/2019 | Deshpande | |
| 2019/0340601 | A1 * | 11/2019 | Wang | G06Q 20/3267 |
| 2020/0014723 | A1 | 1/2020 | Kelly et al. | |
| 2020/0029213 | A1 * | 1/2020 | Nölscher | B60R 25/24 |

FOREIGN PATENT DOCUMENTS

| | | |
|---|---|---|
| CN | 105933039 A | 9/2016 |
| CN | 106303913 A | 1/2017 |
| EP | 3427795 A1 | 1/2019 |
| WO | 2018000134 A1 | 1/2018 |

OTHER PUBLICATIONS

Extended European Search Report dated Jul. 19, 2023 received in European Patent Application No. EP21768350.7.
International Search Report and Written Opinion dated Apr. 14, 2021 in International Application No. PCT/CN2021/073732. English translation attached.
The Grant Notice from corresponding Chinese Application No. 202010155715.X, dated Feb. 11, 2022. English translation attached.
1st Search from corresponding Chinese Application No. 202010155715. X, dated Jan. 23, 2022.

* cited by examiner

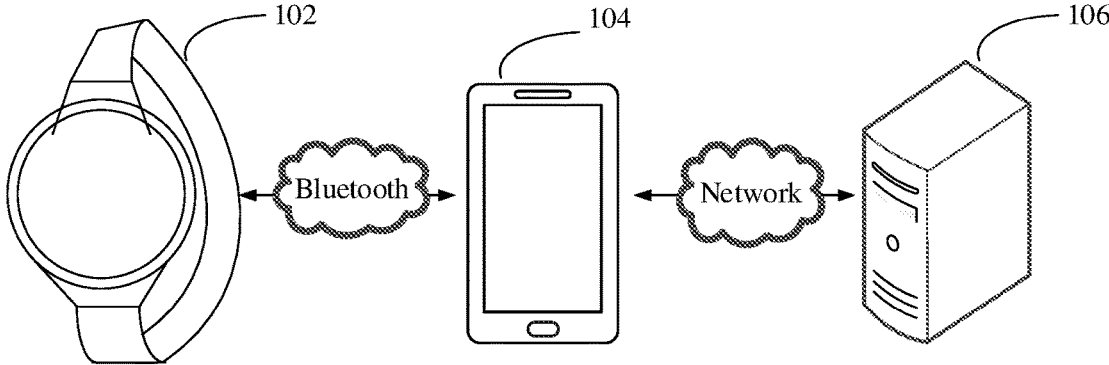

FIG. 1

Receiving, by the first processor, a key transmitted by a second electronic device, and transmitting the key to the second processor, the key being generated by the second electronic device and transmitted by the second electronic device to the first processor through the encrypted channel of the first Bluetooth

Receiving, by the second processor in response to the first electronic device being switched to a system run by the second processor, a first ciphertext transmitted by the second electronic device, the first ciphertext being generated by the second electronic device by encrypting a first plaintext with the key and being transmitted by the second electronic device to the second processor through the unencrypted channel of the second Bluetooth

Obtaining the first plaintext by decrypting the first ciphertext with the key by the second processor

FIG. 2

| | First processor | Second processor |
|---|---|---|
| Screen | √ | |
| TP | √ | |
| PPG | | √ |
| ECG | | √ |
| A+G | | √ |
| ALS | | √ |
| CAP | | √ |
| Magnetometer | | √ |
| Barometer | | √ |
| Key | √ | |

FIG. 5a

|  | First processor | Second processor |
|---|---|---|
| Screen | | √ |
| TP | | √ |
| PPG | | √ |
| ECG | | √ |
| A+G | | √ |
| ALS | | √ |
| CAP | | √ |
| Magnetometer | | √ |
| Barometer | | √ |
| Key | | √ |

FIG. 5b

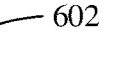
602

Receiving, by the first processor, an identifier of the second electronic device transmitted by the second electronic device, and transmitting the identifier of the second electronic device to the second processor, the identifier of the second electronic device being transmitted by the second electronic device through the encrypted channel of the first Bluetooth

604

Matching, by the second processor in response to the first electronic device being switched to a system run by the second processor, the received identifier of the second electronic device with each candidate device connected to the first electronic device

606

Determining, in response to a presence of one candidate device matching the identifier of the second electronic device, the one candidate device matching the identifier of the second electronic deviceas the second electronic device, and receiving, by the second processor, the first ciphertext transmitted by the second electronic device

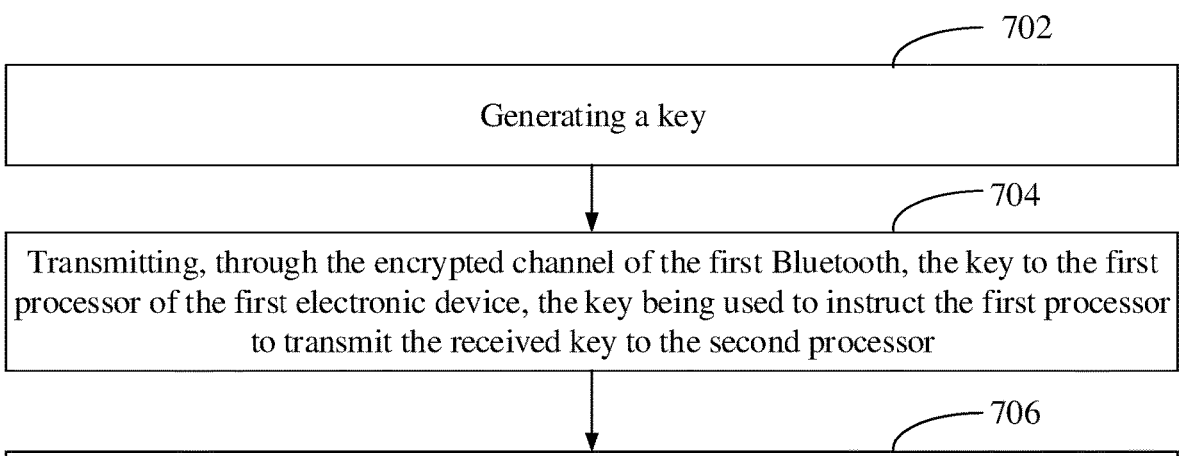

Generating a key

704

Transmitting, through the encrypted channel of the first Bluetooth, the key to the first processor of the first electronic device, the key being used to instruct the first processor to transmit the received key to the second processor

706

Transmitting, in response to detecting that the first electronic device is switched to a system run by the second processor, through the unencrypted channel of the second Bluetooth processor, a first ciphertext to the second processor of the first electronic device, the first ciphertext being generated by the second electronic device by encrypting an obtained first plaintext with the key and used to instruct the second processor to decrypt the first ciphertext with the key to obtain the first plaintext

ENCRYPTED COMMUNICATION METHOD AND ELECTRONIC DEVICE

CROSS-REFERENCE TO RELATED APPLICATION

The present application is a continuation of International Application No. PCT/CN2021/073732, filed on Jan. 26, 2021, which claims priority to Patent Application 202010155715.X with titled "ENCRYPTED COMMUNI- CATION METHOD AND DEVICE, ELECTRONIC DEVICE, AND COMPUTER-READABLE STORAGE MEDIUM", filed on Mar. 9, 2020 with China National Intellectual Property Administration. The disclosures of the aforementioned applications are incorporated herein by ref- erence in their entireties.

FIELD

Embodiments of the present disclosure relate to commu- nication technologies, and more particularly, to an encrypted communication method and apparatus, an electronic device, and a computer-readable storage medium.

BACKGROUND

With the development of communication technology, Bluetooth communication technology emerges. Bluetooth, as a radio technology supporting short-range communica- tion (generally within 10 m) of devices, can exchange wireless information between various devices including mobile phones, Personal Digital Assistant (PDA), wireless headsets, notebook computers, and related peripherals.

However, traditional methods, which adopt Bluetooth for communication, have a problem of low security.

SUMMARY

The embodiments of the present disclosure provide an encrypted communication method and apparatus, an elec- tronic device, and a computer-readable storage medium.

Provided is an encrypted communication method, per- formed by a first electronic device including a first processor and a second processor. The first processor communicates through an encrypted channel of a first Bluetooth, and the second processor communicates through an unencrypted channel of a second Bluetooth. The method includes: receiv- ing, by the first processor, a key transmitted from a second electronic device, and transmitting the key to the second processor, where the key is transmitted from the second electronic device to the first processor through the encrypted channel of the first Bluetooth; receiving, by the second processor in response to the first electronic device being switched to a system run by the second processor, a first ciphertext transmitted from the second electronic device, where the first ciphertext is generated by the second elec- tronic device by encrypting a first plaintext with the key, and where the first ciphertext is transmitted from the second electronic device to the second processor through the unen- crypted channel of the second Bluetooth; and obtaining the first plaintext by decrypting the first ciphertext with the key by the second processor.

Provided is an encrypted communication method, per- formed by a second electronic device in communication with a first electronic device. The first electronic device incudes a first processor and a second processor. The first processor communicates through an encrypted channel of a first Bluetooth, and the second processor communicates through an unencrypted channel of a second Bluetooth. The method includes: generating a key; transmitting, through the encrypted channel of the first Bluetooth, the key to the first processor in the first electronic device, where the key is used to instruct the first processor to transmit the key to the second processor; and transmitting, in response to detecting that the first electronic device is switched to a system run by the second processor, through the unencrypted channel of the second Bluetooth, a first ciphertext to the second pro- cessor in the first electronic device, where the first ciphertext is generated by the second electronic device by encrypting a first plaintext with the key, and where the first ciphertext is configured to instruct the second processor to decrypt the first ciphertext with the key to obtain the first plaintext.

Provided is an electronic device, including a memory having a computer program stored thereon, and a first processor communicating through an encrypted channel of a first Bluetooth; and a second processor communicating through an unencrypted channel of a second Bluetooth. The computer program, when being executed by the processor, causes the processor to implement an encrypted communi- cation method. The method includes: receiving, by the first processor, a key transmitted from an additional electronic device, and transmitting the key to the second processor, wherein the key is transmitted from the additional electronic device to the first processor through the encrypted channel of the first Bluetooth; receiving, by the second processor, in response to the electronic device being switched to a system run by the second processor, a first ciphertext transmitted from the additional electronic device, wherein the first ciphertext is generated by the additional electronic device by encrypting a first plaintext with the key, and wherein the first ciphertext is transmitted from the additional electronic device to the second processor through the unencrypted channel of the second Bluetooth; and obtaining the first plaintext by decrypting the first ciphertext with the key by the second processor.

BRIEF DESCRIPTION OF DRAWINGS

In order to explain the embodiments of the present disclosure or the technical solutions in the related art, the accompanying drawings required for the description of the embodiments or the related art are briefly described below. Obviously, the drawings in the following description are only some embodiments of the present disclosure. For those of ordinary skill in the art, other drawings can also be obtained based on these drawings without any creative effort.

FIG. 1 is a diagram illustrating an application environ- ment diagram of an encrypted communication method according to an embodiment of the present disclosure.

FIG. 2 is a flowchart of an encrypted communication method according to an embodiment of the present disclo- sure.

FIG. 5*a* is a schematic diagram of a peripheral device controlled by a first processor when an electronic device is in a system run by the first processor according to an embodiment of the present disclosure.

FIG. 5b is a schematic diagram of a peripheral device controlled by a second processor when a first electronic device is in a system run by the second processor according to an embodiment of the present disclosure.

FIG. 6 is a flowchart of implementing a second electronic device identifier for matching according to an embodiment of the present disclosure.

FIG. 7 is a flowchart of an encrypted communication method according to another embodiment of the present disclosure.

DESCRIPTION OF EMBODIMENTS

Figure 3A:
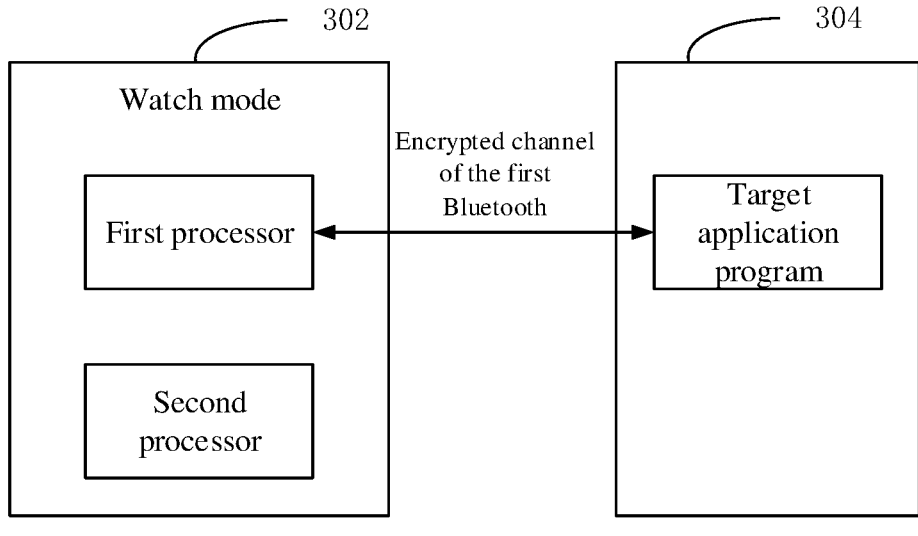
FIG. 3*a* is a schematic diagram of a first electronic device in a watch mode for communication according to an embodiment of the present disclosure.

In order to explain the purpose, technical solutions and advantages of the present disclosure, the present disclosure will be described in detail below with reference to the accompanying drawings and embodiments. It should be appreciated that the specific embodiments described herein are only used to explain, rather than limiting, the present disclosure.

It should be appreciated that the terms "first", "second", etc. in the present disclosure may be used to describe various elements. However, these elements are not limited by these terms. These terms are only used to distinguish a first element from another element. For example, without departing from the scope of the present disclosure, a first electronic device can be referred to as a second electronic device; and similarly, a second electronic device can be referred to as a first electronic device. Both the first electronic device and the second electronic device are electronic devices, but they are not the same electronic device.

FIG. 1 is a diagram illustrating an application environment diagram of an encrypted communication method according to an embodiment of the present disclosure. As illustrated in FIG. 1, the application environment includes a first electronic device 102, a second electronic device 104, and a server 106. The first electronic device 102 and the second electronic device 104 are connected and communicated with each other via Bluetooth. The first electronic device 102 includes a first processor and a second processor. The first processor communicates with the second electronic device 104 through an encrypted channel of a first Bluetooth. The second processor communicates with the second electronic device 104 through an unencrypted channel of a second Bluetooth. The second electronic device 104 communicates with the server 106 via a network. The first electronic device 102 may be, but not limited to, a smart wristband and a wearable device. The second electronic device 104 may be, but not limited to, various personal computers, a notebook computer, a smart phone, a tablet computer, and a portable wearable device. The server 106 may be embodied as an independent server or a server cluster composed of multiple servers.

FIG. 2 is a flowchart of an encrypted communication method according to an embodiment of the present disclosure. The encrypted communication method in the present embodiment is applied in a first electronic device including a first processor and a second processor. The first processor communicates through an encrypted channel of a first Bluetooth, and the second processor communicates through an unencrypted channel of a second Bluetooth. A power consumption of the second Bluetooth is lower than that of the first Bluetooth. As illustrated in FIG. 2, the encrypted communication method includes actions in blocks 202 to 206.

In block 202, a key transmitted from a second electronic device is received by the first processor, and the key is transmitted to the second processor. The key is generated by the second electronic device, and transmitted from the second electronic device to the first processor through the encrypted channel of the first Bluetooth.

The first electronic device includes a first processor and a second processor. The first processor may be used as a main processor, and the second processor may be used as a coprocessor. Alternatively, the first processor may be used as a coprocessor, and the second processor may be used as a main processor.

The first electronic device has a system run by the first processor and a system run by the second processor. That is, the first electronic device is a dual-system electronic device. For example, the system run by the first processor is an Android system, and the system run by the second processor is a Real-time operation system (RTOS system).

When the first electronic device operates in the system run by the first processor, the first electronic device uses the first processor for communication. When the first electronic device operates in the system run by the second processor, the first electronic device uses the second processor for communication.

When the first electronic device operates in the system run by the first processor, a working mode of the first electronic device is a first mode. When the first electronic device operates in the system run by the second processor, the working mode of the first electronic device is a second mode. The first mode uses the first processor for communication, and the second mode uses the second processor for communication. The power consumption of the first mode is lower than that of the second mode.

For example, the first electronic device may be a smart wristband, having dual systems, that is, having the system run by the first processor and the system run by the second processor. The system run by the first processor may be an Android system, while the system run by the second processor may be a RTOS system. When the smart wristband operates in the Android system, the first mode of the smart wristband may be watch mode, and the Android system can provide more complete functions. When the smart wristband operates in the RTOS system, the second mode of the smart wristband may be a twist band mode, and the RTOS system can provide ultra-long standby capability with low power consumption.

Bluetooth is a radio technology that supports short-range communication (generally within 10 m) of devices, and it can exchange wireless information between various devices including mobile phones, PDA, wireless headsets, notebook computers, and related peripherals.

Bluetooth includes classic Bluetooth, low energy Bluetooth, and so on. The classic Bluetooth includes Basic Rate (BR) Bluetooth, Enhanced Data Rate (EDR) Bluetooth, etc. The low energy Bluetooth includes Bluetooth Low Energy (BLE) Bluetooth. Both the first Bluetooth and the second Bluetooth may be any kind of Bluetooth as mentioned above, as long as the power consumption of the second Bluetooth is lower than that of the first Bluetooth. For example, the first Bluetooth may be the classic Bluetooth BR Bluetooth or EDR Bluetooth, and the second Bluetooth may be the BLE Bluetooth.

The key transmitted from the second electronic device is received by the first processor, and the received key is transmitted to the second processor by the first processor. It should be appreciated that the first processor communicates through the encrypted channel of the first Bluetooth, and the second processor communicates through the unencrypted channel of the second Bluetooth. The key transmitted from the second electronic device is received by the first processor through the encrypted channel of the first Bluetooth, to avoid the problem of key leakage, which may occur when the key transmitted from the second electronic device is received by the second processor through the unencrypted channel of the second Bluetooth, thereby guaranteeing the security of the key.

In an embodiment, the first electronic device is a smart wristband. When the first electronic device operates the system run by the first processor, the first electronic device is in the watch mode. When the first electronic device operates the system run by the second processor, the first electronic device is in the twist band mode.

As illustrated in FIG. 3a, the first electronic device 302 includes a first processor and a second processor, and the second electronic device 304 has a target application program installed therein. When the first electronic device is in the watch mode, the first processor in the first electronic device 302 communicates with the target application in the second electronic device 304 through the encrypted channel of the first Bluetooth.

Figure 3B:
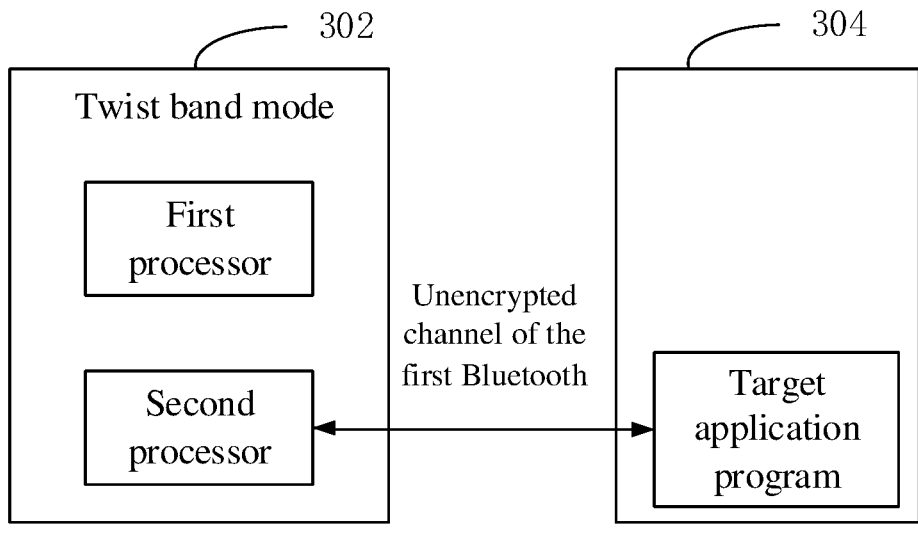
FIG. 3*b* is a schematic diagram of a first electronic device in a twist band mode for communication according to an embodiment of the present disclosure.

As illustrated in FIG. 3b, when the first electronic device is in the twist band mode, the second processor in the first electronic device 302 communicates with the target application in the second electronic device 304 through the unencrypted channel of the first Bluetooth.

In block 204, when the first electronic device is switched to the system run by the second processor, a first ciphertext transmitted from the second electronic device is received by the second processor. The first ciphertext is generated by the second electronic device by encrypting a first plaintext with the key, and transmitted from the second electronic device to the second processor through the unencrypted channel of the second Bluetooth.

When the first electronic device operates in the system run by the first processor, the first processor in the first electronic device communicates with the second electronic device through the encrypted channel of the first Bluetooth. When the first electronic device is switched to the system run by the second processor, the second processor in the first electronic device communicates with the second electronic device through the unencrypted channel of the second Bluetooth. It should be appreciated that the unencrypted channel of the second Bluetooth has relatively low security. Therefore, when the first electronic device is switched to the system run by the second processor, both the second processor in the first electronic device and the second electronic device encrypt the communication data and then transmit the communication data through the unencrypted channel of the second Bluetooth, in order to ensure the security of the communication data.

In another embodiment, the key is generated by the target application in the second electronic device, and the target application is connected to the first electronic device. For example, the first electronic device is a smart wristband, the second electronic device is a smart phone, and the target application is a health APP. The smart wristband may obtain various data such as user's daily walking distance, sleeping time, and heartbeat frequency, etc., and transmit various data to the health APP in the smart phone. The health APP can obtain various instructions of the user, such as the instruction to collect the user's heartbeat frequency, and transmit the various instructions to the smart wristband.

Figure 4:
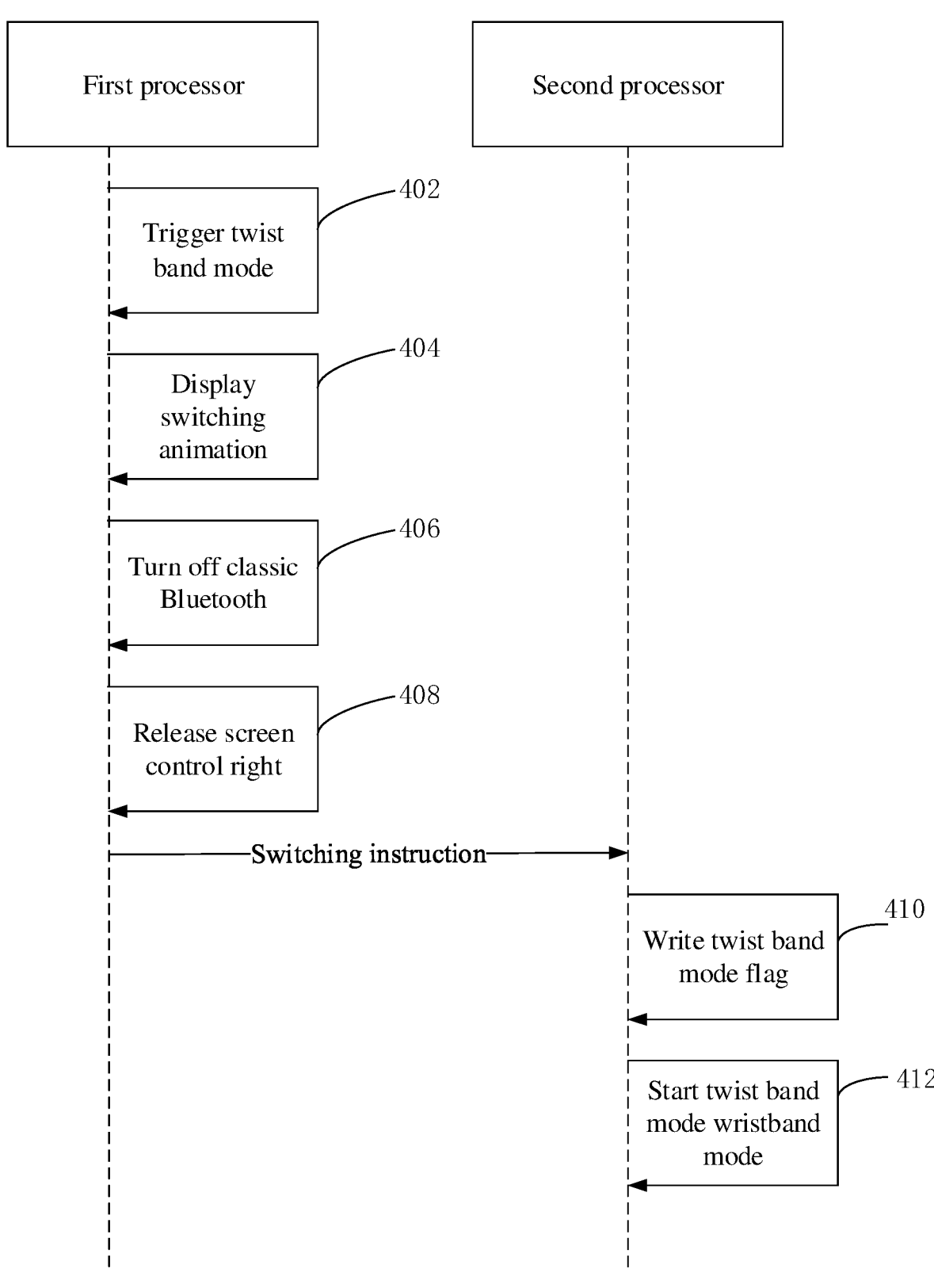
FIG. 4 is a flowchart of switching a first electronic device to a system where a second processor is located according to an embodiment of the present disclosure.

In an embodiment, as illustrated in FIG. 4, the first electronic device is a smart wristband. When the first electronic device operates in the system run by the first processor, the first electronic device is in the watch mode. When the first electronic device operates in the system run by the second processor, the first electronic device is in the twist band mode. When the smart wristband is switched from the watch mode to the twist band mode, action in block 402 can be executed to trigger the twist band mode, action in block 404 is executed to display the switching animation, action in block 406 is executed to turn off the first Bluetooth, and action in block 408 is executed to release a screen control right. The first processor of the first electronic device transmits a switching instruction to the second processor. The switching instruction may be MSG: REQ_HOST_BAND_MODE. After the first processor releases the screen control right, the first processor is in an off state. When the second processor receives the switching instruction, action in block 410 is executed to write a twist band mode flag, and action in block 412 is executed to start the twist band mode.

In block 206, the first plaintext is obtained by decrypting the first ciphertext with the key by the second processor.

The first ciphertext transmitted from the second electronic device to the second processor is encrypted with a key, and the key is same as the key transmitted by the first processor and received by the second processor. Therefore, the second processor can use the key to decrypt the first ciphertext, so as to obtain the first plaintext.

In this embodiment, the above-described encrypted communication method and apparatus, electronic device and computer-readable storage medium are applied in the first electronic device including the first processor and the second processor. The first processor communicates through the encrypted channel of the first Bluetooth, and the second processor communicates through the unencrypted channel of the second Bluetooth. The method includes: receiving, by the first processor, the key transmitted from the second electronic device, and transmitting the key to the second processor, in which the key is transmitted from the second electronic device to the first processor through the encrypted channel of the first Bluetooth, thereby guaranteeing the security of the key. When the first electronic device is switched to the system run by the second processor, that is, the first electronic device communicates with the second electronic device via the second processor, and the second processor communicates through the unencrypted channel of the second Bluetooth, the first ciphertext transmitted from the second electronic device is received by the second electronic device, and the first ciphertext is decrypted by the second processor with the key to obtain the first plaintext, thereby avoiding data leakage when plaintext is used for communication between the second electronic device and the second processor and improving the security of the communication between the second electronic device and the first electronic device. In addition, the power consumption of the communication can be reduced by communicating through the unencrypted channel of the second Bluetooth.

In an embodiment, the first electronic device is a smart wristband. As illustrated in FIG. 5a, when the smart wristband is in a watch mode, i.e., when the first electronic device operates in the system run by the first processor, the first processor can control Screen (display screen), Touch Screen (TP) to receive the key. As illustrated in FIG. 5b, when the smart wristband is switched to the twist band mode, that is, when the first electronic device operates in the system run by the second processor, the second processor can control Screen (display screen), Touch Screen (TP) to receive the key. The second processor may also control PPG, ECG, A+G, ALS, CAP, Magnetometer and Barometer.

In an embodiment, as illustrated in FIG. 6, the above method further includes the following actions in blocks.

In block 602, an identifier of the second electronic device transmitted from the second electronic device is received by the first processor, and the identifier of the second electronic device is transmitted to the second processor. The identifier of the second electronic device is transmitted from the second electronic device through the encrypted channel of the first Bluetooth.

The identifier of the second electronic device may uniquely identify the second electronic device. The second electronic device can be uniquely found by the identifier of the second electronic device. The identifier of the second electronic device may be at least one of a MAC address of the second electronic device, a name of the second electronic device, a character string, and the like.

In block 604, when the first electronic device being switched to the system run by the second processor, the received identifier of the second electronic device is matched by the second processor with each candidate device connected to the first electronic device.

It should be appreciated that the second processor communicates through the unencrypted channel of the second Bluetooth, and all candidate devices within the communication range of the second processor can be connected to and communicate with the second processor. Therefore, the second processor matches the received identifier of the second electronic device with the respective connected candidate devices, and searches for the second electronic device among the candidate devices, allowing the second processor to communicate with the second electronic device accurately.

In block 606, when a candidate device matches the identifier of the second electronic device, the candidate device matching the identifier of the second electronic device is determined as the second electronic device, and the first ciphertext transmitted from the second electronic device is received by the second processor.

In this embodiment, the identifier of the second electronic device transmitted from the second electronic device is received by the first processor, and the identifier of the second electronic device is transmitted to the second processor; the identifier of the second electronic device is transmitted from the second electronic device through the encrypted channel of the first Bluetooth; when the first electronic device is switched to the system run by the second processor, the received identifier of the second electronic device is matched by the second processor with the each candidate device connected to the first electronic device. In this way, the user does not need to match the first electronic device with the second electronic device, improving the efficiency of communication. In addition, when a candidate device matches the identifier of the second electronic device, the candidate device matching the identifier of the second electronic device is determined as the second electronic device, and the second processor receives the first ciphertext transmitted from the second electronic device. The second electronic device can be accurately found by the identifier of the second electronic device, which avoids unlawful connection or misconnection of the peripheral devices of the first electronic device. Therefore, the second processor can accurately communicate with the second electronic device.

In an embodiment, the above method further includes: obtaining a second plaintext by the second processor; and generating a second ciphertext by encrypting the second plaintext with the key; and transmitting the second ciphertext to the second electronic device through the unencrypted channel of the second Bluetooth. The second ciphertext is configured to instruct the second electronic device to decrypt the second ciphertext with the key to obtain the second plaintext.

When the second processor communicates with the second electronic device, the second processor encrypts the second plaintext with the key to obtain the second ciphertext, and transmits the second ciphertext to the second electronic device through the unencrypted channel of the second Bluetooth to encrypt the second plaintext, avoiding leakage of the second plaintext during transmission in the encrypted channel, and improving the security. After receiving the second ciphertext, the second electronic device can decrypt the second ciphertext using the key to obtain the second plaintext. The second processor communicates with the second electronic device through the unencrypted channel of the second Bluetooth, which can reduce the power consumption.

In an embodiment, the above method further includes: determining a current running system in response to detecting to an initial connection to the second electronic device; receiving, by the first processor, the key transmitted from the second electronic device in response to the current running system being a system run by the first processor; switching, in response to the current running system being the system run by the second processor, the first electronic device to the system run by the first processor; and receiving, by the first processor, the key transmitted from the second electronic device.

Said detecting the initial connection to the second electronic device means that the first electronic device is connected to the second electronic device for the first time; or the first electronic device and the second electronic device have ever been connected, but the first electronic device clears the cache and is then connected to the second electronic device.

When it is detected that the second electronic device is connected to the first electronic device for the first time, the current running system is determined by the first electronic device. The current running system on the first electronic device may be one of the systems run by the first processor and the system run by the second processor.

When the current running system is the system run by the first processor, the operation of receiving, by the first processor, the key transmitted from the second electronic device is executed. When the current running system is the system run by the second processor, the first electronic device first switches the current running system to the system run by the first processor, and uses the encrypted channel of the first Bluetooth to communicate with the second electronic device. That is, the key transmitted from the second electronic device is received through the encrypted channel of the first Bluetooth, guaranteeing the security of the key.

FIG. 7 is a flowchart of an encrypted communication method according to another embodiment of the present disclosure. The encrypted communication method in this embodiment is applied in a second electronic device in communication with a first electronic device. The first electronic device includes a first processor and a second processor. The first processor communicates through an encrypted channel of a first Bluetooth, and the second processor communicates through an unencrypted channel of a second Bluetooth. The power consumption of the second Bluetooth is lower than that of the first Bluetooth. As illustrated in FIG. 7, the encrypted communication method includes actions in blocks 702 to 706.

In block 702, a key is generated.

Further, the key may be generated by a target application in the second electronic device. For example, the target application is a health APP connected to the first electronic device.

In block 704, the key is transmitted through the encrypted channel of the first Bluetooth to the first processor of the first electronic device. The key is used to instruct the first processor to transmit the received key to the second processor.

In block 706, when it is detected that the first electronic device is switched to a system run by the second processor, a first ciphertext is transmitted through the unencrypted channel of the second Bluetooth to the second processor of the first electronic device. The first ciphertext is generated by the second electronic device by encrypting a first plaintext with the key, and is used to instruct the second processor to decrypt the first ciphertext with the key to obtain the first plaintext.

The above encrypted communication method, applied in a second electronic device in communication with a first electronic device, the first electronic device including a first processor and a second processor, the first processor communicating through an encrypted channel of a first Bluetooth, the second processor communicating through an unencrypted channel of a second Bluetooth. The power consumption of the second Bluetooth is lower than that of the first Bluetooth. The method includes generating a key and transmitting, through the encrypted channel of the first Bluetooth, the key to the first processor of the first electronic device, so that the security of the key is guaranteed. The key is used to instruct the first processor to transmit the received key to the second processor. When it is detected that the first electronic device is switched to the system run by the second processor, that is, the first electronic device communicates with the second electronic device via the second processor, and the second processor communicates through the unencrypted channel of the second Bluetooth, the method includes: transmitting, through the unencrypted channel of the second Bluetooth, the first ciphertext to the second processor of the first electronic device. The first ciphertext is generated by the second electronic device by encrypting the obtained first plaintext with the key. The first ciphertext is configured to instruct the second processor to decrypt the first ciphertext with the key to obtain the first plaintext, avoiding the leakage of data when the second electronic device communicates with the second processor using plaintext, and improving the security of the communication between the second electronic device and the first electronic device. The power consumption of the communication can also be reduced by communicating through the unencrypted channel of the second Bluetooth.

In an embodiment, the above method further includes: transmitting, through the encrypted channel of the first Bluetooth, an identifier of the second electronic device to the first processor of the first electronic device, the identifier of the second electronic device being used to instruct the first processor to transmit the received identifier of the second electronic device to the second processor; matching, by the second processor, the received identifier of the second electronic device with each candidate device connected to the first electronic device; determine, in response to a presence of one candidate device matching the identifier of the second electronic device, the one candidate device matching the identifier of the second electronic device as the second electronic device; and receive, by the second processor, the first ciphertext transmitted from the second electronic device.

In this embodiment, the identifier of the second electronic device is transmitted to the first processor in the first electronic device through the encrypted channel of the first Bluetooth. The identifier of the second electronic device is used to instruct the first processor to transmit the received identifier of the second electronic device to the second processor. The received identifier of the second electronic device is matched by the second processor with each candidate device connected to the first electronic device. In this way, when the first electronic device switches the system, the user does not need to match the first electronic device and the second electronic device, thereby improving the efficiency of communication. When there is a candidate device matching the identifier of the second electronic device, the candidate device matching the identifier of the second electronic device is determined as the second electronic device. Therefore, the second electronic device can be accurately found by means of the identifier of the second electronic device, which enables the second processor to accurately communicate with the second electronic device, that is, the first ciphertext transmitted from the second electronic device is received by the second processor.

In an embodiment, the above method further includes: transmitting the key to a server; obtaining, in response to the second electronic device clearing the key, an identifier of the first electronic device connected to the second electronic device; transmitting the identifier of the first electronic device to the server, the identifier of the first electronic device being used to instruct the server to obtain the key matching the identifier of the first electronic device; and receiving the key matching the identifier of the first electronic device transmitted from the server.

The second electronic device clearing the key may be that the second electronic device deletes the key, or the second electronic device clears the cache to clear the key, which is not limited to these of examples.

Further, the identifier of the first electronic device is transmitted to the server, and the identifier of the first electronic device can also be used to instruct the server to obtain device information matching the identifier of the first electronic device, such as a MAC address of the first electronic device, a user name of the first electronic device, a brand of the first electronic device, etc.

In this embodiment, the key is transmitted to the server. When the second electronic device clears the key, the identifier of the connected first electronic device can be obtained and transmitted to the server. A key matching the identifier of the first electronic device can be obtained from the server. Even after the second electronic device clears the key, the key can be obtained from the server again, and the second electronic device can communicate with the first electronic device through the key.

Figure 8:
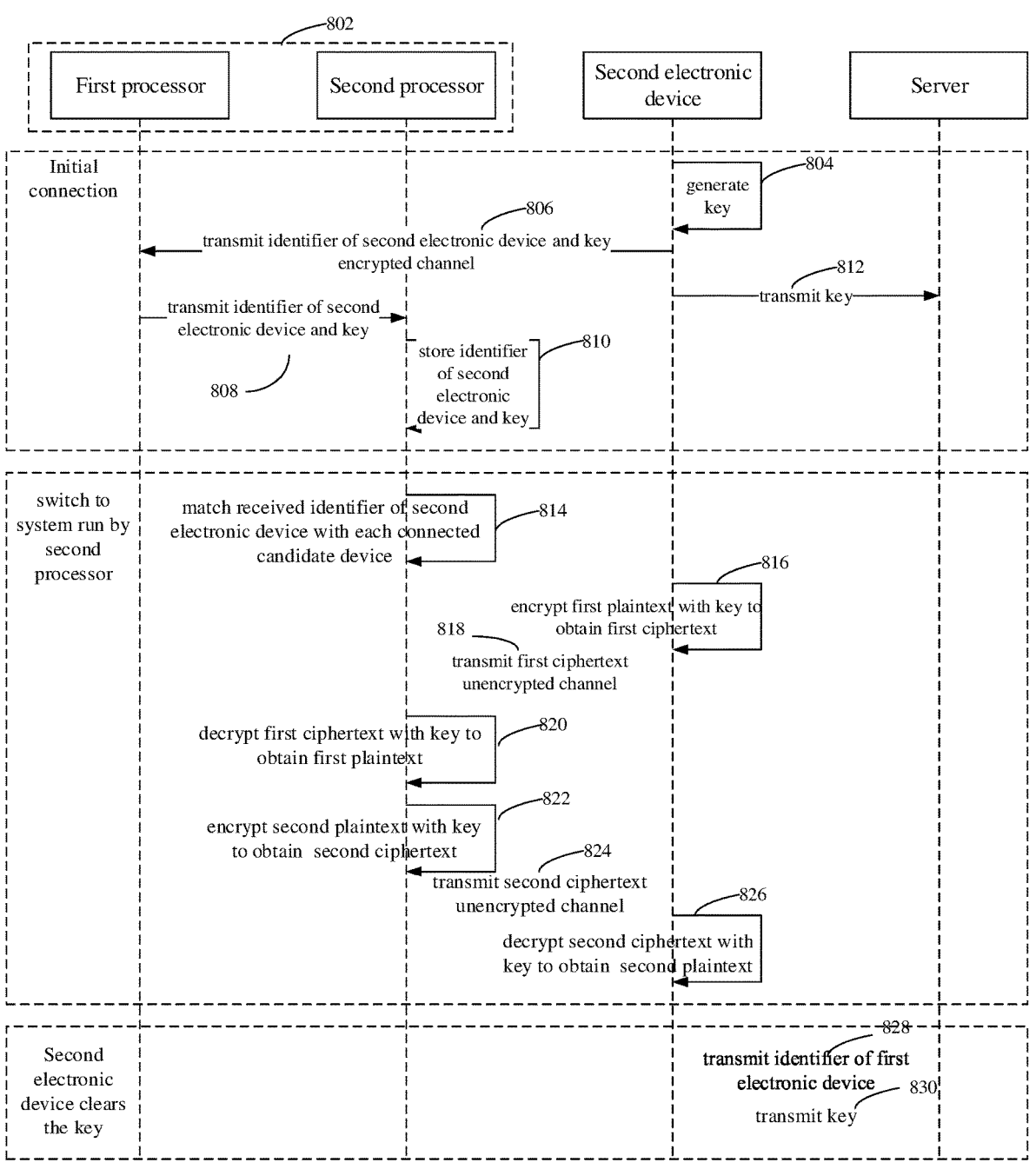
FIG. 8 is a flowchart of an encrypted communication method according to another embodiment of the present disclosure.

In an embodiment, as illustrated in FIG. 8, 802 indicates a first electronic device, and the first electronic device includes a first processor and a second processor. When the first electronic device 802 is connected to the second electronic device for the first time, the second electronic device executes an action in block 804 to generate a key. The second electronic device executes an action in block 806 to transmit the identifier of the second electronic device and the key to the first processor in the first electronic device 802 through the encrypted channel of the first Bluetooth. When the first processor receives the identifier of the second electronic device and the key transmitted from the second electronic device, the first processor executes an action in block 808 to transmit the identifier of the second electronic device and the key to the second processor. When the second processor receives the identifier of the second electronic device and the key transmitted by the first processor, the second processor executes an action in block 810 to store the identifier of the second electronic device and the key. The second electronic device executes an action in block 812 to transmit the key to the server.

When the first electronic device is switched to the system run by the second processor, the second processor executes an action in block 814 to match the received identifier of the second electronic device with each candidate device connected to the first electronic device. When there is a candidate device matching the identifier of the second electronic device, the candidate device matching the identifier of the second electronic device is determined as the second electronic device. The second electronic device executes an action in block 816 to encrypt the first plaintext with the key to obtain the first ciphertext. The second electronic device executes an action in block 818 to transmit the first ciphertext to the second processor through the unencrypted channel of the second Bluetooth. When the second processor receives the first ciphertext, the second processor executes an action in block 820 to decrypt the first ciphertext with the key to obtain the first plaintext. The second processor executes an action in block 822 to encrypt the second plaintext with the key to obtain the second ciphertext. The second processor executes an action in block 824 to transmit the second ciphertext to the second electronic device through the unencrypted channel of the second Bluetooth. When the second electronic device receives the second ciphertext, an action in block 826 is executed to decrypt the second ciphertext with the key to obtain the second plaintext.

After the second electronic device clears the key, the second electronic device may obtain an identifier of the first electronic device connected to the second electronic device. An action in block 828 is executed to transmit the identifier of the first electronic device to the server. When the server receives the identifier of the first electronic device, the server obtains a key matching the identifier of the first electronic device, and executes an action in block 830 to transmit the key to the second electronic device.

It should be appreciated that, although the respective actions in the flowcharts of FIG. 2, FIG. 6 and FIG. 7 are in an order indicated with arrows, the order of executing these actions is not limited thereto, unless otherwise specified herein. These actions may be executed in other orders. Moreover, at least a part of the actions illustrated in FIG. 2, FIG. 6 and FIG. 7 may include multiple sub-actions or multiple stages, which are not necessarily executed and completed at the same time, but may be executed at different times. The order of executing these sub-actions or stages may not necessarily be consecutive, but they may be executed in turn or alternately with at least a part of other actions, sub-actions of the other actions, or stages of other actions.

Figure 9:
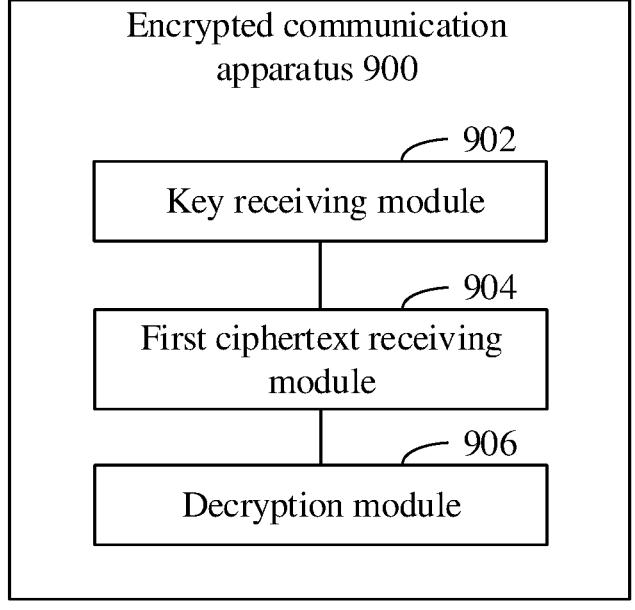
FIG. 9 is a structural block diagram of an encrypted communication apparatus according to an embodiment of the present disclosure.

FIG. 9 is a structural block diagram of an encrypted communication apparatus according to an embodiment of the present disclosure. As illustrated in FIG. 9, an encrypted communication apparatus 900 is provided, and it is applied in a first electronic device including a first processor and a second processor. The first processor communicates through the encrypted channel of the first Bluetooth, and the second processor communicates through the unencrypted channel of the second Bluetooth. The power consumption of the second Bluetooth is lower than that of the first Bluetooth. The apparatus includes a key receiving module 902, a first ciphertext receiving module 904, and a decryption module 906.

The key receiving module 902 is configured to: receive, by the first processor, a key transmitted from a second electronic device, and transmit the key to the second processor. The key is generated by the second electronic device and transmitted from the second electronic device to the first processor through the encrypted channel of the first Bluetooth.

The first ciphertext receiving module 904 is configured to: receive, by the second processor in response to the first electronic device being switched to a system run by the second processor, a first ciphertext transmitted from the second electronic device. The first ciphertext is generated by the second electronic device by encrypting the first plaintext with the key and transmitted from the second electronic device to the second processor through the unencrypted channel of the second Bluetooth.

The decryption module 906 is configured to decrypt, by the second processor, the first ciphertext with the key to obtain the first plaintext.

The above encrypted communication apparatus is applied in the first electronic device including the first processor and the second processor, the first processor communicating through the encrypted channel of the first Bluetooth, and the second processor communicating through the unencrypted channel of the second Bluetooth. The power consumption of the second Bluetooth is lower than that of the first Bluetooth. The apparatus receives, by the first processor, the key transmitted from the second electronic device and transmits the key to the second processor. The key is transmitted from the second electronic device to the first processor through the encrypted channel of the first Bluetooth. In this way, the security of the key can be guaranteed. When the first electronic device is switched to the system run by the second processor, that is, the first electronic device communicates with the second electronic device via the second processor, and the second processor communicates through the unencrypted channel of the second Bluetooth, the first ciphertext transmitted from the second electronic device is received by the second electronic device, and the first ciphertext is decrypted with the key by the second processor to obtain the first plaintext, avoiding the data leakage when plaintext is used for communication between the second electronic device and the second processor, and improving the security of the communication between the second electronic device and the first electronic device. In addition, the power consumption of the communication can be reduced by communicating through the unencrypted channel of the second Bluetooth.

In an embodiment, the above-mentioned encrypted communication apparatus 900 further includes a matching module. The matching module is configured to: receive, by the first processor, an identifier of the second electronic device transmitted from the second electronic device; transmit the identifier of the second electronic device to the second processor. The identifier of the second electronic device is transmitted from the second electronic device through the encrypted channel of the first Bluetooth. The matching module is further configured to: match, by the second processor in response to the first electronic device being switched to the system run by the second processor, the received identifier of the second electronic device with each candidate device connected to the first electronic device; and the matching module is configured to: determine, in response to a presence of one candidate device matching the identifier of the second electronic device, the one candidate device matching the identifier of the second electronic device as the second electronic device; and receive, by the second processor, the first ciphertext transmitted from the second electronic device.

In an embodiment, the above-mentioned encrypted communication device 900 further includes an encryption module. The encryption module is configured to: obtain a second plaintext by the second processor; generate a second ciphertext by encrypting the second plaintext with the key; and transmit the second ciphertext to the second electronic device through the unencrypted channel of the second Bluetooth. The second ciphertext is configured to instruct the second electronic device to decrypt the second ciphertext with the key, to obtain the second plaintext.

In an embodiment, the above-mentioned encrypted communication device 900 further includes a current running system determining module. The current running system determining module is configured to: in response to detecting to an initial connection to the second electronic device, determine a current running system; receive, by the first processor in response to the current running system being a system run by the first processor, the key transmitted from the second electronic device; switch, in response to the current running system being the system run by the second processor, the first electronic device to the system run by the first processor; and receive, by the first processor, the key transmitted from the second electronic device.

Figure 10:
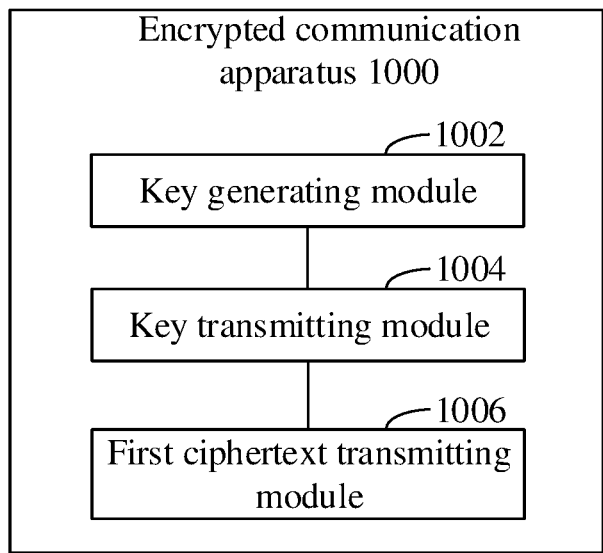
FIG. 10 is a structural block diagram of an encrypted communication apparatus according to another embodiment of the present disclosure.

FIG. 10 is a structural block diagram of an encrypted communication apparatus according to an embodiment. As illustrated in FIG. 10, an encrypted communication apparatus 1000 is provided, and it is applied in a second electronic device in communication with a first electronic device. The first electronic device includes a first processor and a second processor. The first processor communicates through an encrypted channel of a first Bluetooth, and the second processor communicates through an unencrypted channel of a second Bluetooth. The power consumption of the second Bluetooth is lower than the power consumption of the first Bluetooth. The apparatus includes a key generating module 1002, a key transmitting module 1004, and a first ciphertext transmitting module 1006.

The key generating module 1002 is configured to generate a key.

The key transmitting module 1004 is configured to transmit, through the encrypted channel of the first Bluetooth, the key to the first processor of the first electronic device. The key is used to instruct the first processor to transmit the received key to the second processor.

The first ciphertext transmitting module 1006 is configured to: transmit, in response to detecting that the first electronic device is switched to a system run by the second processor, through the unencrypted channel of the second Bluetooth, a first ciphertext to the second processor of the first electronic device. The first ciphertext is generated by the second electronic device by encrypting a first plaintext with the key. The first ciphertext is configured to instruct the second processor to decrypt the first ciphertext with the key to obtain the first plaintext.

The above encrypted communication apparatus, applied in the second electronic device in communication with the first electronic device, the first electronic device includes the first processor and the second processor, the first processor communicating through the encrypted channel of the first Bluetooth, and the second processor communicating through the unencrypted channel of the second Bluetooth. The power consumption of the second Bluetooth is lower than that of the first Bluetooth. The key is generated and transmitted, through the encrypted channel of the first Bluetooth, to the first processor of the first electronic device, thereby guaranteeing that the security of the key. The key is used to instruct the first processor to transmit the received key to the second processor. When it is detected that the first electronic device is switched to the system run by the second processor, that is, the first electronic device communicates with the second electronic device via the second processor, and the second processor communicates through the unencrypted channel of the second Bluetooth, the first ciphertext is transmitted through the unencrypted channel of the second Bluetooth to the second processor of the first electronic device. The first ciphertext is generated by the second electronic device by encrypting a first plaintext with the key, and the first ciphertext is configured to instruct the second processor to decrypt the first ciphertext with the key to obtain the first plaintext, avoiding the leakage of data when the second electronic device communicates with the second processor using plaintext, and improving the security of the communication between the second electronic device and the first electronic device. In addition, the power consumption of the communication can be reduced by communicating through the unencrypted channel of the second Bluetooth.

In an embodiment, the above-mentioned encrypted communication apparatus 1000 further includes a transmitting module for transmitting an identifier of the second electronic device. The transmitting module is configured to: transmit, through the encrypted channel of the first Bluetooth, an identifier of the second electronic device to the first processor of the first electronic device, where the identifier of the second electronic device is used to instruct the first processor to transmit the received identifier of the second electronic device to the second processor; match, by the second processor, the received identifier of the second electronic device with each candidate device connected to the first electronic device; determine, in response to a presence of one candidate device matching the identifier of the second electronic device, the one candidate device matching the identifier of the second electronic device as the second electronic device; and receive, by the second processor, the first ciphertext transmitted from the second electronic device.

In an embodiment, the above-mentioned encrypted communication apparatus 1000 further includes a key obtaining module. The key obtaining module is configured to: transmit the key to a server; obtain, in response to the second electronic device clearing the key, an identifier of the first electronic device connected to the second electronic device; transmit the identifier of the first electronic device to the server, where the identifier of the first electronic device is used to instruct the server to obtain the key matching the identifier of the first electronic device; and receive the key matching the identifier of the first electronic device transmitted from the server.

The division of respective modules in the above-mentioned encrypted communication apparatus is only for illustration. In other embodiments, the encrypted communication apparatus may be divided into different modules as required, to complete all or part of the functions of the above-mentioned encrypted communication apparatus.

For the specific limitations of the encrypted communication apparatus, reference may be made to the above limitations of the encrypted communication method, and details thereof will be omitted herein. Each module in the above-mentioned encrypted communication apparatus can be embodied completely or in part by software, hardware and combinations thereof. The above modules can be embedded in or independent of the processor in a computer device in the form of hardware, or stored in a memory of the computer device in the form of software, allowing the processor to call and execute the operations corresponding to the above modules.

Figure 11:
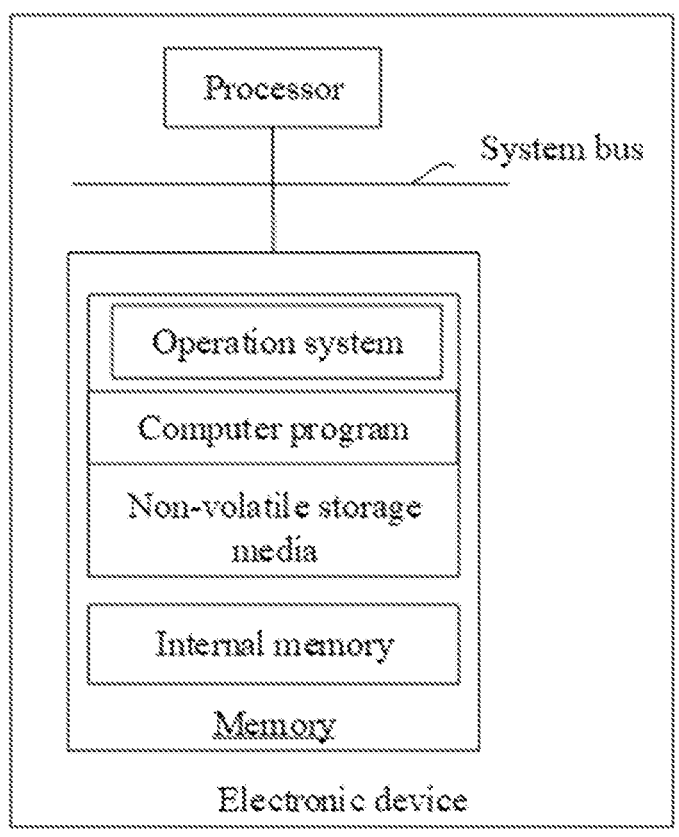
FIG. 11 is a schematic diagram of an internal structure of an electronic device according to an embodiment of the present disclosure.

FIG. 11 is a schematic diagram of an internal structure of an electronic device according to an embodiment. As illustrated in FIG. 11, the electronic device includes a processor and a memory connected by a system bus. The processor is configured to provide computing and control capabilities to support the operation of the entire electronic device. The memory may include non-volatile storage media and internal memory. The nonvolatile storage medium stores an operation system and a computer program. The computer program can be executed by the processor to implement the encrypted communication method provided by the above-mentioned embodiments. Internal memory provides a cached execution environment for the operation system computer programs in non-volatile storage media. The electronic device may be any terminal device such as a mobile phone, a tablet computer, a PDA, a Point of Sale (POS), a vehicle-mounted computer, a wearable device, and the like.

The respective modules in the encrypted communication apparatus provided in the embodiments of the present disclosure may be embodied in the form of a computer program. The computer program may be run on a terminal or server. The program modules constituted by the computer program can be stored in the memory of the electronic device. When the computer program is executed by the processor, the actions of the methods described in the embodiments of the present disclosure can be implemented.

Embodiments of the present disclosure also provide a computer-readable storage medium. One or more non-volatile computer-readable storage media containing computer-executable instructions are provided. The computer-executable instructions, when being executed by one or more processors, cause the processors to execute the actions of the encrypted communication method.

A computer program product containing instructions is provided. The computer program product, when running on a computer, causes the computer to perform the encrypted communication method.

Any reference to a memory, storage, database or other medium used in the present disclosure may include non-transitory and/or transitory memory. Non-transitory memory may include Read-Only Memory (ROM), Programmable ROM (PROM), Electrically Programmable ROM (EPROM), Electrically Erasable Programmable ROM (EEPROM), or flash memory. Transitory memory may include Random Access Memory (RAM), which acts as external cache memory. By way of illustration and not limitation, RAM is available in various forms such as Static RAM (SRAM), Dynamic RAM (DRAM), Synchronous DRAM (SDRAM), Double Data Rate SDRAM (DDR SDRAM), Enhanced SDRAM (ESDRAM), Synchronous Link DRAM (SLDRAM), Rambus Direct RAM (RDRAM), Direct Rambus Dynamic RAM (DRDRAM), and Rambus Dynamic RAM (RDRAM).

The above-mentioned embodiments only represent several embodiments of the present disclosure, and the descriptions thereof are relatively specific and detailed. However, these embodiments should not be construed as limitations on the scope of the patent of the present disclosure. It should be pointed out that those skilled in the art, without departing from the concept of the present disclosure, can make several modifications and improvements, which shall all belong to the protection scope of the present disclosure. Therefore, the scope of protection of the patent of the present disclosure shall be defined by the appended claims.

What is claimed is:

1. An encrypted communication method, performed by a first electronic device comprising a first processor and a second processor, the first processor configured to run a first operation system and communicating through an encrypted channel of a first Bluetooth, the second processor configured to run a second operation system and communicating through an unencrypted channel of a second Bluetooth, the method comprising:

receiving, by the first processor configured to run the first operation system, a key transmitted from a second electronic device, and transmitting the key to the second processor, wherein the key is transmitted from the second electronic device to the first processor through the encrypted channel of the first Bluetooth;

receiving, by the second processor, in response to the first electronic device being switched to the second operation system run by the second processor, a first ciphertext transmitted from the second electronic device, wherein the first ciphertext is generated by the second electronic device by encrypting a first plaintext with the key, and wherein the first ciphertext is transmitted from the second electronic device to the second processor through the unencrypted channel of the second Bluetooth; and obtaining the first plaintext by decrypting the first ciphertext with the key by the second processor;

wherein the method further comprises:

receiving, by the first processor, an identifier of the second electronic device transmitted from the second electronic device, and transmitting the identifier of the second electronic device to the second processor, wherein the identifier of the second electronic device is transmitted from the second electronic device through the encrypted channel of the first Bluetooth;

matching, by the second processor, in response to the first electronic device being switched to the second operation system run by the second processor, the received identifier of the second electronic device with a candidate device connected to the first electronic device; and receiving, by the second processor, the first ciphertext transmitted from the candidate device serving as the second electronic device.

2. The encrypted communication method according to claim 1, further comprising:

obtaining a second plaintext by the second processor; and generating a second ciphertext by encrypting the second plaintext with the key, and transmitting the second ciphertext to the second electronic device through the unencrypted channel of the second Bluetooth, wherein the second ciphertext is configured to instruct the second electronic device to decrypt the second ciphertext with the key to obtain the second plaintext.

3. The encrypted communication method according to claim 1, further comprising:

determining a current running system in response to detecting an initial connection to the second electronic device;

receiving, by the first processor, in response to the current running system being the first operation system run by the first processor, the key transmitted from the second electronic device; and switching, in response to the current running system being the second operation system run by the second processor, the first electronic device to the first operation system run by the first processor, and receiving, by the first processor, the key transmitted from the second electronic device.

4. The encrypted communication method according to claim 3, wherein the initial connection to the second electronic device indicates that:

the first electronic device is connected to the second electronic device for the first time; or the first electronic device and the second electronic device have ever been connected, and after the first electronic device clears a cache, the first electronic device is connected to the second electronic device.

5. The encrypted communication method according to claim 1, further comprising:

communicating by using the first processor in response to the first electronic device being in the first operation system run by the first processor; and communicating by using the second processor in response to the first electronic device being in the second operation system run by the second processor.

6. The encrypted communication method according to claim 1, wherein a power consumption of the second Bluetooth is lower than a power consumption of the first Bluetooth.

7. The encrypted communication method according to claim 1, wherein the first electronic device, when operating in the first operation system run by the first processor, is in a first mode; and wherein the first electronic device, when operating in the second operation system run by the second processor, is in a second mode.

8. The encrypted communication method according to claim 7, further comprising:

triggering the second mode, in response to the first electronic device being switched from the first mode to the second mode;

displaying a switching animation;

turning off the first Bluetooth;

releasing a screen control right by the first processor in a switching-off state;

transmitting a switching instruction from the first processor of the first electronic device transmits to the second processor of the first electronic device; and writing, in response to the second processor receiving the switching instruction, a second mode flag, and starting the second mode.

9. An encrypted communication method, performed by a second electronic device in communication with a first electronic device, the first electronic device comprising a first processor and a second processor, the first processor configured to run a first operation system and communicating through an encrypted channel of a first Bluetooth, and the second processor configured to run a second operation system and communicating through an unencrypted channel of a second Bluetooth, the method comprising:

generating a key;

transmitting, through the encrypted channel of the first Bluetooth, the key to the first processor configured to run the first operation system in the first electronic device, wherein the key is used to instruct the first processor to transmit the key to the second processor; and transmitting, in response to detecting that the first electronic device is switched to the second operation system run by the second processor, through the unencrypted channel of the second Bluetooth, a first ciphertext to the second processor in the first electronic device, wherein the first ciphertext is generated by the second electronic device by encrypting a first plaintext with the key, and wherein the first ciphertext is configured to instruct the second processor to decrypt the first ciphertext with the key to obtain the first plaintext;

wherein the method further comprises:

transmitting, through the encrypted channel of the first Bluetooth, an identifier of the second electronic device to the first processor in the first electronic device, wherein the identifier of the second electronic device is used to instruct the first processor to transmit the received identifier of the second electronic device to the second processor;

matching, by the second processor, the received identifier of the second electronic device with a candidate device connected to the first electronic device; and receiving, by the second processor, the first ciphertext transmitted from the candidate device serving as the second electronic device.

10. The encrypted communication method according to claim 9, further comprising:

transmitting the key to a server;

obtaining, in response to the second electronic device clearing the key, an identifier of the first electronic device connected to the second electronic device, and transmitting the identifier of the first electronic device to the server, wherein the identifier of the first electronic device is used to instruct the server to obtain the key matching the identifier of the first electronic device; and receiving the key matching the identifier of the first electronic device transmitted from the server.

11. The encrypted communication method according to claim 10, wherein the second electronic device clearing the key is the second electronic device deleting the key, or the second electronic device clearing a cache for clearing the key.

12. The encrypted communication method according to claim 9, wherein said generating the key comprises:

generating the key by a target application connected to the first electronic device.

13. An electronic device, comprising:

a memory having a computer program stored thereon; and a first processor configured to run a first operation system and communicating through an encrypted channel of a first Bluetooth; and a second processor configured to run a second operation system and communicating through an unencrypted channel of a second Bluetooth, wherein the computer program, when being executed by a processor, causes the processor to implement an encrypted communication method comprising:

receiving, by the first processor configured to run the first operation system, a key transmitted from an additional electronic device, and transmitting the key to the second processor, wherein the key is transmitted from the additional electronic device to the first processor through the encrypted channel of the first Bluetooth;

receiving, by the second processor, in response to the electronic device being switched to the second operation system run by the second processor, a first ciphertext transmitted from the additional electronic device, wherein the first ciphertext is generated by the additional electronic device by encrypting a first plaintext with the key, and wherein the first ciphertext is transmitted from the additional electronic device to the second processor through the unencrypted channel of the second Bluetooth; and obtaining the first plaintext by decrypting the first ciphertext with the key by the second processor;

wherein the method further comprises:

receiving, by the first processor, an identifier of the additional electronic device transmitted from the additional electronic device, and transmitting the identifier of the additional electronic device to the second processor, wherein the identifier of the additional electronic device is transmitted from the additional electronic device through the encrypted channel of the first Bluetooth;

matching, by the second processor, in response to the first electronic device being switched to the second operation system run by the second processor, the received identifier of the additional electronic device with a candidate device connected to the first electronic device; and receiving, by the second processor, the first ciphertext transmitted from the candidate device serving as the additional electronic device.

14. The electronic device according to claim 13, wherein:

the electronic device in the first operation system run by the first processor communicates by using the first processor; and the electronic device in the second operation system run by the second processor communicates by using the second processor.

15. The electronic device according to claim 13, wherein a power consumption of the second Bluetooth is lower than a power consumption of the first Bluetooth.

16. The electronic device according to claim 13, wherein the electronic device, when operating in the first operation system run by the first processor, is in a first mode; and wherein the electronic device, when operating in the second operation system run by the second processor, is in a second mode.

17. The electronic device according to claim 13, wherein the electronic device is a smart wristband.

* * * * *